United States Patent [19]
Borrelli et al.

[11] Patent Number: 5,275,979
[45] Date of Patent: Jan. 4, 1994

[54] COLORED GLASSES AND METHOD

[75] Inventors: Nicholas F. Borrelli, Elmira; David W. Morgan, Corning, both of N.Y.; Michel Prassas, Vulaines, France; Dennis W. Smith, Corning, N.Y.

[73] Assignee: Corning Incorporated, Corning, N.Y.

[21] Appl. No.: 969,388

[22] Filed: Oct. 30, 1992

[51] Int. Cl.⁵ .......................... C03C 4/06; C03C 3/11
[52] U.S. Cl. ................................ 501/13; 501/56
[58] Field of Search ....................... 501/13, 56, 64

[56] References Cited

U.S. PATENT DOCUMENTS

| | | |
|---|---|---|
| 3,892,582 | 7/1975 | Simms .................... 501/13 |
| 3,920,463 | 11/1975 | Simms .................... 501/13 |
| 4,134,747 | 1/1979 | Pierson et al. ........... 65/30.1 |
| 4,240,836 | 12/1980 | Borrelli et al. ............ 501/13 |
| 4,390,635 | 6/1983 | Morgan .................. 501/13 |
| 4,757,034 | 7/1988 | Prassas ................... 501/13 |
| 4,891,336 | 1/1990 | Prassas ................... 501/13 |
| 5,023,209 | 6/1991 | Grateau et al. ........... 501/13 |

*Primary Examiner*—Mark L. Bell
*Assistant Examiner*—David Sample
*Attorney, Agent, or Firm*—Milton M. Peterson; Clinton S. Janes, Jr.

[57] ABSTRACT

Thermally induced color is developed in a glass article containing a silver halide crystal phase by including in the glass batch a thermal reducing agent, retaining the thermal reducing agent in its lower valence state while melting the batch and forming the glass article and subsequently heat treating the article to partially reduce the silver halide crystal phase.

8 Claims, 4 Drawing Sheets

COLORED GLASSES AND METHOD

FIELD OF THE INVENTION

The field is development of color in a glass containing silver and one or more halogens in its composition.

BACKGROUND OF THE INVENTION

Photochromic glasses containing silver and one or more halogens in their compositions are well known. Normally, such glasses are clear and uncolored as produced. However, when exposed to ultraviolet radiation, a photochromic glass becomes light absorbing over a broad range of wavelengths in the visible portion of the spectrum. The absorption is reversible, that is, the glass returns to the clear state when the exciting radiation is removed.

Various photochromic materials are known. However, the commercially viable material at the present time is a glass containing one or more silver halide crystal phases selected from AgCl, AgBr and AgI. As melted, silver and halogen are dissolved in a glass. Upon a controlled thermal treatment, as amply described in the patent literature, a silver halide crystal phase is precipitated in the glass. The crystals constituting this phase are subject to photolysis, thereby giving rise to photochromism, that is, reversible coloring behavior. As used herein, the terms "halide" and "halogen" refer to chlorine, bromine and iodine, fluorine not being effective to impart photochromic behavior.

If desired, it is possible to impart permanent coloration to photochromic glasses with conventional glass colorants. These include such known colorants as NiO, CoO, $Cr_2O_3$ and MnO which may be incorporated in a glass batch in usual manner.

In the recent past, another method of inducing permanent coloration in a photochromic glass was discovered. This method involved a high temperature thermal treatment in a reducing atmosphere, such as hydrogen. The thermal treatment can bring about a permanent, partial or complete reduction of silver halide to silver. A wide range of colors can be produced that depends on the temperature of the reduction treatment. This method is described in detail in U.S. Pat. No. 4,240,836 (Borrelli et al.).

Although the exact mechanism of this induced coloration is not well understood, it is proposed that the color depends on the extent of reduction of the silver halide to silver. The reason for this hypothesis is threefold. First, the color produced by silver particles in glass is yellow. This results from a single absorption band at 400 nm, where it would be predicted to appear from simple scattering theory. The appearance of absorption bands, which are considerably shifted toward the red, indicate the presence of something other than simply reduced silver in glass. Second, the colors produced by the reduction depend on the temperature of the treatment alone. Chemical reduction leading to a greater amount of silver would not be expected to change the spectral position of the absorption band as is observed. Third, the color variation can only be obtained if the hydrogen treatment is carried out below the melting temperature of the silver halide phase in the glass. This suggests the presence and critical role of the silver halide phase.

One should recognize that the color produced by the hydrogen reduction resides in a surface layer corresponding to the depth of diffusion of hydrogen. It can be shown that, in situations where the diffusion is accompanied by a fast chemical reaction, the layer thickness is proportional to the square root of time of the reduction treatment. The remaining portion of the glass is the uncolored photochromic glass, and exhibits the usual photochromic behavior.

It is a primary purpose of the present invention to provide an alternative means of achieving permanent coloration effects in a glass having a silver halide crystal phase. The coloration effects are similar to those previously achieved by hydrogen atmospheric reduction. Both methods involve a thermal reduction step, but the presently proposed method has a number of advantages.

A primary advantage is that the need for treatment in a hydrogen-containing atmosphere is avoided. Another advantage is that the present method is effective in the same temperature range as that found effective to induce photochromic behavior in potentially photochromic glasses. This avoids the need for a separate thermal treatment. Another advantage is that the present method is effective in certain glasses that contain a silver halide phase, but do not exhibit photochromic behavior. A further advantage is that color is developed throughout the glass; not just in a surface layer.

SUMMARY OF THE INVENTION

One aspect of our invention is a method of producing a glass article having a fixed tint throughout the body of the article which comprises formulating and mixing a batch for an $R_2O$—$B_2O_3$—$Al_2O_3$—$SiO_2$ base glass, incorporating in the batch a source of silver, a source of at least one halogen other than fluorine, and a thermal reducing agent, melting the batch and forming the article from the molten glass while essentially retaining the thermal reducing agent in its lower valence state, thermally treating the article at a temperature in the range of 600°–700° C. for up to one hour to precipitate a silver halide crystal phase in the glass and to activate a controlled reaction between the thermal reducing agent and the silver halide to reduce only a portion of the silver to the metallic state.

Another aspect of our invention is a $R_2O$—$Al_2O_3$—$B_2O_3$—$SiO_2$ glass article that exhibits color throughout its body, that contains a thermal reducing agent in an amount not over about 1 cation % and that has dispersed throughout the article a silver halide crystal phase that is partially reduced to silver metal, the degree of reduction being sufficient to produce color in the glass. In a preferred embodiment, the glass composition, as calculated in cation percent, consists essentially of 35–70% $SiO_2$, 2–12% $Al_2O_3$, 20–35% $B_2O_3$, 8–30% $R_2O$ selected from 0–20% $Li_2O$, 0–20% $Na_2O$, and 0–12% $K_2O$, 0.01–1% of a thermal reducing agent from the group $SnO_2$, $Sb_2O_3$ and $As_2O_3$, 0.25–1% Cl+Br, 0.05–0.50% Ag, 0–0.1% CuO.

PRIOR ART

In addition to the Borrelli et al. patent noted earlier, attention is also directed to the following U.S. patents:

U.S. Pat. Nos. 3,892,582 and 3,920,463 (Simms) describe methods of changing the tint in a photochromic glass by a thermal, or thermal plus radiation, treatment in a reducing atmosphere. These methods have the disadvantages previously noted.

U.S. Pat. No. 4,134,747 (Pierson et al.) describes a method of either opacifying or coloring a glass by precipitating a controlled number of sub-microscopic particles of a noble metal, and growing NaF crystals on the noble metal nuclei. The glass requires 0.1-1% of $Sb_2O_3$ and/or $SnO_2$, and is exposed to a sequence of radiation and thermal treatments.

U.S. Pat. No. 4,891,336 (Prassas) describes transparent, fast darkening and fading photochromic glasses that may contain $Sb_2O_3$, $As_2O_3$ and/or $SnO_2$ to provide a brown photochromic color upon exposure to actinic radiation.

U.S. Pat. No.4,390,635 (Morgan) describes transparent photochromic glasses containing silver halide crystals sensitized with copper. The glasses further contain at least 0.025% $As_2O_3$ and/or $Sb_2O_3$ to insure that more than 50% of the copper is in the Cu+ state.

BRIEF DESCRIPTION OF THE DRAWINGS

In the accompanying drawings.

DESCRIPTION OF THE INVENTION

The present invention is based on our discovery that permanent coloration can be thermally developed throughout a glass body containing silver halide crystals by incorporating a thermal reducing agent in the glass batch. This avoids employing a subsequent reducing atmosphere treatment. Furthermore, in a photochromic glass, the thermal treatment may be in the same temperature range required for developing photochromic behavior, that is the range of 600°-700° C. for times up to about one hour. Thus, a single thermal treatment suffices to impart both permanent coloration and photochromic behavior, thereby avoiding the previous need for a separate treatment.

The essential elements of our coloration method then are: (1) an $R_2O$—$Al_2O_3$—$B_2O_3$—$SiO_2$ base glass in which a silver halide crystal phase may be formed; (2) the presence of a source of silver, a source of a halogen other than fluorine, preferably chlorine, and a thermal reducing agent that exhibits at least two valence states in the glass batch; and (3) a thermal treatment to form a silver halide phase and to partially reduce that phase to elemental silver by transfer of electrons from the thermal reducing agent.

The base glass will be composed essentially of alkali metal oxides ($R_2O$), $Al_2O_3$, $B_2O_3$ and $SiO_2$. Any of the base glasses heretofore disclosed for silver halide photochromic glasses are contemplated. However, normal photochromic behavior of a glass is not a requirement. A silver halide crystal phase may be precipitated without the glass exhibiting photochromic characteristics, but, rather, because of additional kinetic considerations. Other glass modifiers, such as the alkaline earth metal oxides, zirconia, titania, and niobium oxide may be present in known manner to modify such properties as refractive index and glass viscosity.

Glasses which we have found particularly useful have compositions consisting essentially of the following constituents in the indicated ranges, the ranges being in cation percent:

| | |
|---|---|
| $SiO_2$ | 35-70% |
| $Al_2O_3$ | 2-12% |
| $B_2O_3$ | 20-35% |
| $R_2O$ | 8-30% |
| $Li_2O$ | 0-20% |
| $Na_2O$ | 0-20% |

-continued

| | |
|---|---|
| $K_2O$ | 0-12% |
| $SnO_2$ | 0-1% |
| $Sb_2O_3$ | 0-1% |
| $As_2O_3$ | 0-1% |
| $SnO_2$ + $Sb_2O_3$ + $As_2O_3$ | 0.01-1% |
| Cl + Br | 0.25-1% |
| Ag | 0.05-0.5% |
| CuO | 0-0.1% |

The halogens are in weight %.

The reductant selected for present purposes is termed a thermal reducing agent. This means that the agent does not effect reduction of silver, and hence cause glass coloration, during the melting step. However, it is capable of changing its equilibrium state, during a reheating step. In this manner, electrons are contributed to silver in a controlled manner. Thereby, a portion of the silver in a silver halide phase, but not necessarily all of the silver, may be reduced. Thus, the glass as melted and formed is clear and uncolored, but has a potential for becoming colored on reheatinq.

The coloring action of a thermal reducing agent varies with the reheating schedule. Thus, the degree of silver reduction, and hence the nature of the color induced, depend on the time and temperature of the reheating step. They also depend on the reducing agent employed and the extent to which the reduct state has been retarded. We prefer to use $Sb_2O_3$ and $SnO_2$ as reducing agents because of their ready availability; also, the years of experience the glass industry has had in using these oxides in glass melting. However, $As_2O_3$ also has the capability of performing as a thermal reducing agent.

The basic role of the thermal reducing agent is to be in its most reduced form, that is, its lowest valence state, at a glass melting temperature. This reduced form should be maintained during the melting process, as well as during relatively rapid cooling to a glassy state. Reheating the cooled glass to a lower temperature than the melting temperature allows a thermal equilibrium to be established between the valence states of the reducing agent. In the process, electrons are given up by the reducing agent as it partially oxidizes, thereby serving to reduce silver halide in a controlled manner. This is shown in the following formulae using antimony and silver ions for illustrations:

$$Sb^{+3} - 2e \rightarrow Sb^{+5}$$

$$2Ag^+ + 2e \rightarrow 2Ag^0$$

The reduction strength required by the present invention, that is, the particular thermal reducing agent and its concentration, depends on a number of variables. In addition to the reductant itself and the time-temperature cycle of the thermal reduction of silver, we have found that the strength required is dependent on the base glass composition and the temperature at which the glass is melted.

For reasons not fully understood, some glasses may be sufficiently reduced when melted at normal meltinq temperature for these glasses, that is, in the range of 1350°-1450° C. Other glasses, however, require a melting temperature over 1500° C., for example 1550° C., to achieve sufficient reduction of the thermal reducing agent for present purposes. It appears that higher melting temperatures tend to effect greater reduction of a thermal reducing agent in a melt. Thus, the equilibrium between valence states in the agent is shifted toward the lower level at higher melting temperatures.

It is not possible, therefore, to define specific reductant concentrations that are universally applicable. Rather, we have found it necessary to use relative measures based on determinations that may be readily made using electron spin resonance (ESR) spectroscopy. This is a technique used to determine relative concentrations, at different valence states, of such multivalent ions as iron, copper, titanium and arsenic. The ratio then is the concentration of an ion at one valence level in a glass permanently colored by the present method compared to the concentration of the same ion at the same valence level in the same glass prior to treatment. Such prior concentration is taken as unity.

In order to develop permanent coloration by the present method in a glass containing silver halide crystals, the glass must be reduced to a certain level. At that level, the ratio of concentration levels for a given reference ion falls within a predetermined range for the glass. A higher ratio, indicative of low reduction strenqth, fails to produce permanent coloration. Conversely, a lower ratio, indicative of high reduction potential, results in complete reduction of the silver to the metal. This eliminates any photochromic potential, and creates the characteristic color of reduced silver in glass.

Where measurement of the $Fe^{+3}$ ion concentration is effective for present purposes, iron is a convenient reference to use. It is normally present as an impurity in sand; it provides a strong signal for measurement; and, it provides stable values that are not influenced by the presence of silver. However, experience has shown iron to not be a reliable indicator of the reduction potential in some glasses. Therefore, it becomes necessary to use ratios of other ions, such as copper, or antimony, or titanium, in these glasses.

As noted earlier, the reduction potential for a given reducing agent and concentration may vary with the specific base glass composition. This then determines the reducing aqent and concentration used. Certain tendencies have been observed with respect to the effect of the base glass composition. Among these are the total alkali metal oxide ($R_2O$) content of the base glass, as well as the mix, or relative amounts, of the alkali metal oxides. The term alkali metal oxides is here used to encompass the principal alkali metal oxides used in glass production, namely, $Na_2O$, $K_2O$ and $Li_2O$.

In general, the greater the $R_2O$ content of a glass, the easier it is to color the glass, and the more diverse the colors available. As a general rule, a higher $Na_2O$ content, and lower $Li_2O$ content, appears to favor coloration. However, high $R_2O$ contents may be detrimental to certain other properties in a glass, thus limiting use of this enhancement.

The effect of the alkali mix at times appears to be inconsistent. This we believe is because a certain level of $Li_2O$ appears necessary for development of a silver halide crystal phase. Further increase in $Li_2O$ appears to enhance the amount of the silver halide crystal phase.

However, once the silver halide phase is present in a glass, we believe that $Na_2O$ is more favorable to thermal reduction of silver, and hence development of color in the glass. Thus, we believe that $Na_2O$ and $Li_2O$ play distinctly different roles in color development in accordance with our invention. Normally, then, it is necessary to compromise and employ both oxides in a glass composition for present purposes.

The invention is further described with reference to specific examples. TABLES IA and IB set forth compositions of several glasses containing silver and halogen components. These glasses are capable of having a silver halide crystal phase developed therein. TABLE IA sets forth the compositions in cation percent. TABLE IB presents the same compositions in parts by weight which approximate percent by weight.

TABLE IA

| | Cat % | | | | | | | | | | | |
|---|---|---|---|---|---|---|---|---|---|---|---|---|
| | A | B | C | D | E | F | G | H | I | J | K | L |
| $SiO_2$ | 40.8 | 43.5 | 44.3 | 47.0 | 44.8 | 44.8 | 44.8 | 44.8 | 44.8 | 44.8 | 44.8 | 44.8 |
| $B_2O_3$ | 23.0 | 27.8 | 23.0 | 24.0 | 23 | 23 | 23 | 23 | 23 | 23 | 23 | 23 |
| $Al_2O_3$ | 4.0 | 8.0 | 9.2 | 7.0 | 6.3 | 6.3 | 6.3 | 6.3 | 6.3 | 6.3 | 6.3 | 6.3 |
| $Li_2O$ | 10.3 | 9.0 | 9.5 | 13.0 | 12.3 | 16.4 | 10.3 | 6.9 | 3.1 | 13.3 | 8.2 | 2.1 |
| $Na_2O$ | 5.1 | 2.3 | 7.0 | 4.5 | 4.1 | 2.1 | 5.1 | 6.9 | 8.8 | 1.8 | 3.3 | 16.4 |
| $K_2O$ | 5.1 | 5.0 | 7.0 | 4.5 | 4.1 | 2.1 | 5.1 | 6.8 | 8.6 | 5.3 | 9.0 | 2.1 |
| $ZrO_2$ | 1.2 | 1.0 | — | — | 1.2 | 1.2 | 1.2 | 1.2 | 1.2 | 1.2 | 1.2 | 1.2 |
| $TiO_2$ | 3.5 | 0.7 | — | — | 1.2 | 1.2 | 1.2 | 1.2 | 1.2 | 1.2 | 1.2 | 1.2 |
| SrO | 3.0 | — | — | — | — | — | — | — | — | — | — | — |
| $Nb_2O_5$ | 4.0 | — | — | — | — | — | — | — | — | — | — | — |
| CaO | — | 2.9 | — | — | 3 | 3 | 3 | 3 | 3 | 3 | 3 | 3 |
| $Sb_2O_3$ | 0.06 | — | 0.06 | 0.06 | 0.2 | 0.2 | 0.2 | 0.2 | 0.2 | 0.2 | 0.2 | 0.2 |
| CuO | 0.013 | 0.0016 | 0.012 | 0.012 | 0.02 | 0.02 | 0.02 | 0.02 | 0.02 | 0.02 | 0.02 | 0.02 |
| Ag | 0.07 | 0.06 | 0.06 | 0.06 | 0.13 | 0.13 | 0.13 | 0.13 | 0.13 | 0.13 | 0.13 | 0.13 |
| NiO | — | — | 0.06 | — | — | — | — | — | — | — | — | — |
| $Co_3O_4$ | — | — | 0.01 | — | — | — | — | — | — | — | — | — |
| $SnO_2$ | — | 0.1 | — | — | — | — | — | — | — | — | — | — |
| Cl* | 0.23 | 0.23 | 0.25 | 0.25 | 0.23 | 0.23 | 0.23 | 0.23 | 0.23 | 0.23 | 0.23 | 0.23 |
| Br* | 0.18 | 0.10 | 0.20 | 0.20 | 0.16 | 0.16 | 0.16 | 0.16 | 0.16 | 0.16 | 0.16 | 0.16 |

*Wgt %

TABLE IB

| | Wt. % | | | | | | | | | | | |
|---|---|---|---|---|---|---|---|---|---|---|---|---|
| | A | B | C | D | E | F | G | H | I | J | K | L |
| $SiO_2$ | 46.3 | 54.5 | 57.3 | 61.7 | 56.4 | 57.5 | 55.8 | 54.9 | 53.9 | 56.4 | 54.7 | 54.8 |
| $B_2O_3$ | 15.1 | 20.2 | 17.2 | 18.2 | 16.8 | 17.1 | 16.6 | 16.3 | 16.0 | 16.8 | 16.3 | 16.3 |
| $Al_2O_3$ | 3.9 | 8.5 | 10.1 | 7.8 | 6.7 | 6.9 | 6.7 | 6.5 | 6.4 | 6.7 | 6.5 | 6.5 |
| $Li_2O$ | 2.9 | 2.8 | 3.1 | 4.2 | 3.8 | 5.2 | 3.2 | 2.1 | 0.9 | 4.2 | 2.5 | 0.6 |

TABLE IB-continued

| | Wt. % | | | | | | | | | | | |
|---|---|---|---|---|---|---|---|---|---|---|---|---|
| | A | B | C | D | E | F | G | H | I | J | K | L |
| Na$_2$O | 3.0 | 1.5 | 4.7 | 3.0 | 2.7 | 1.4 | 3.3 | 4.4 | 5.4 | 1.2 | 2.1 | 10.4 |
| K$_2$O | 4.5 | 4.9 | 7.1 | 4.6 | 4.0 | 2.1 | 5.0 | 6.5 | 8.1 | 5.2 | 8.6 | 2.0 |
| ZrO$_2$ | 2.8 | 2.6 | — | — | 3.1 | 3.2 | 3.1 | 3.0 | 3.0 | 3.1 | 3.0 | 3.0 |
| TiO$_2$ | 5.3 | 1.2 | — | — | 2.0 | 2.0 | 2.0 | 2.0 | 1.9 | 2.0 | 1.9 | 2.0 |
| SrO | 5.9 | — | — | — | — | — | — | — | — | — | — | — |
| Nb$_2$O$_5$ | 10.0 | — | — | — | — | — | — | — | — | — | — | — |
| CaO | — | 3.4 | — | — | 3.5 | 3.6 | 3.5 | 3.4 | 3.4 | 3.5 | 3.4 | 3.4 |
| Sb$_2$O$_3$ | 0.17 | — | 0.19 | 0.19 | 0.61 | 0.62 | 0.60 | 0.59 | 0.58 | 0.61 | 0.59 | 0.59 |
| CuO | 0.020 | 0.0026 | 0.021 | 0.021 | 0.033 | 0.034 | 0.033 | 0.032 | 0.032 | 0.033 | 0.032 | 0.032 |
| Ag | 0.14 | 0.14 | 0.14 | 0.14 | 0.29 | 0.30 | 0.29 | 0.29 | 0.28 | 0.29 | 0.29 | 0.29 |
| NiO | — | — | 0.097 | — | — | — | — | — | — | — | — | — |
| Co$_3$O$_4$ | — | — | 0.017 | — | — | — | — | — | — | — | — | — |
| Cl | 0.23 | 0.23 | 0.25 | 0.25 | 0.23 | 0.23 | 0.23 | 0.23 | 0.23 | 0.23 | 0.23 | 0.23 |
| Br | 0.18 | 0.10 | 0.20 | 0.20 | 0.16 | 0.16 | 0.16 | 0.16 | 0.16 | 0.16 | 0.16 | 0.16 |
| SnO$_2$ | — | 0.31 | — | — | — | — | — | — | — | — | — | — |

The invention is further illustrated with reference to specific tests carried out on glasses having compositions set forth in TABLE I.

EXAMPLE 1

A glass batch was formulated on the basis of composition A. The batch was melted at 1350° C. for 3 hours, poured into molds to provide test pieces that were annealed at 500° C. As melted and molded, the glass was colorless. Test pieces of the glass were exposed for 20 minutes each to temperatures ranging from 600° to 660° C. This is the temperature range in which a silver halide crystal phase tends to form.

TABLE II sets forth the temperature at which each test piece was heated, together with the degree of coloration observed in the thermally treated test piece.

TABLE II

| Test Piece | Temp. | Coloration |
|---|---|---|
| 1 | Blank | None |
| 2 | 600° | Moderate |
| 3 | 630° | Strong |
| 4 | 650° | Strong |
| 5 | 660° | Strong |

Figure 1:
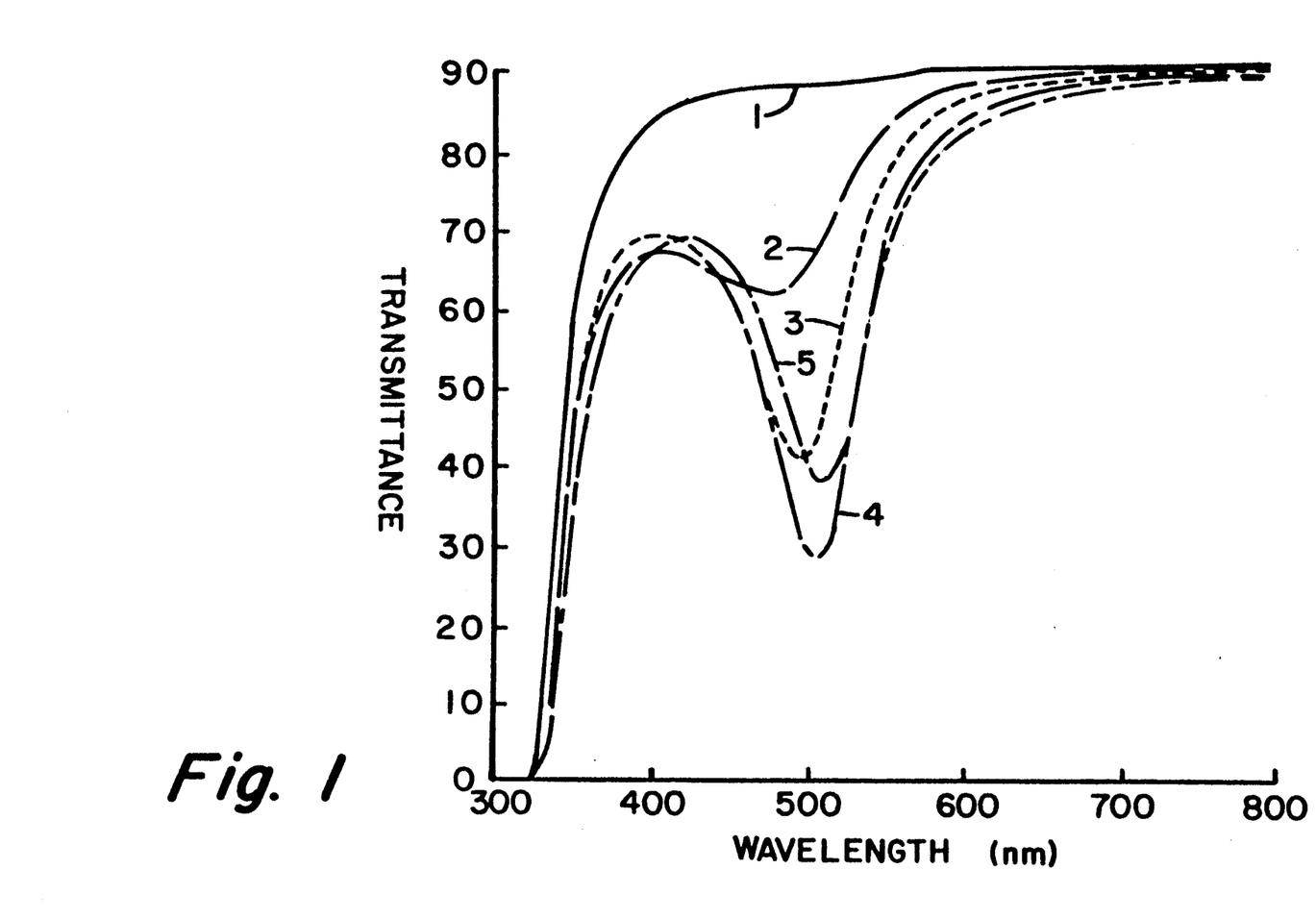
FIGS. 1, 2, 3 and 4 are graphical representations illustrating coloration effects obtained in accordance with the present invention.

FIG. 1 in the drawing is a graphical representation of the transmittance curves for the several test pieces as measured on a Carey 210 grating spectrophotometer. The curves are identified by the test piece numbers from TABLE II. Transmittance is plotted on the vertical axis in percent. Wavelengths across the visible spectrum are plotted along the horizontal axis.

The dependence of the wavelength of developed absorption maximum on the thermal treatment is indicative of the degree of partial reduction of the silver halide phase. That phase develops concurrently with permanent color development. It may be noted that the glass of this example is essentially non-photochromic.

EXAMPLE 2

A glass batch was formulated on the basis of composition C. The batch was melted at 1450° C. for 3 hours, poured into molds to provide test pieces that were annealed at 500° C. As melted and molded, the glasses were colorless and non-photochromic. Four test pieces were given different heat treatments to determine the effect on coloration. Each test piece was heated for 30 minutes at a temperature in the range of 600°-650° C. In two instances, this thermal treatment was preceded by a nucleation step in which the test piece was heated at 550° C. for 30 minutes. No color was observed after this preliminary thermal treatment.

TABLE III sets forth the thermal cycle (°C./minutes) for each test piece. Also, the degree of coloration observed at the conclusion of the cycle is recorded.

TABLE III

| Test Piece | Thermal Cycle | Coloration |
|---|---|---|
| 6 | 550/30 | None |
|   | 600/30 | Moderate |
| 7 | 625/30 | Moderate |
| 8 | 550/30 | None |
|   | 625/30 | Strong |
| 9 | 650/30 | Strong |

Figure 2:
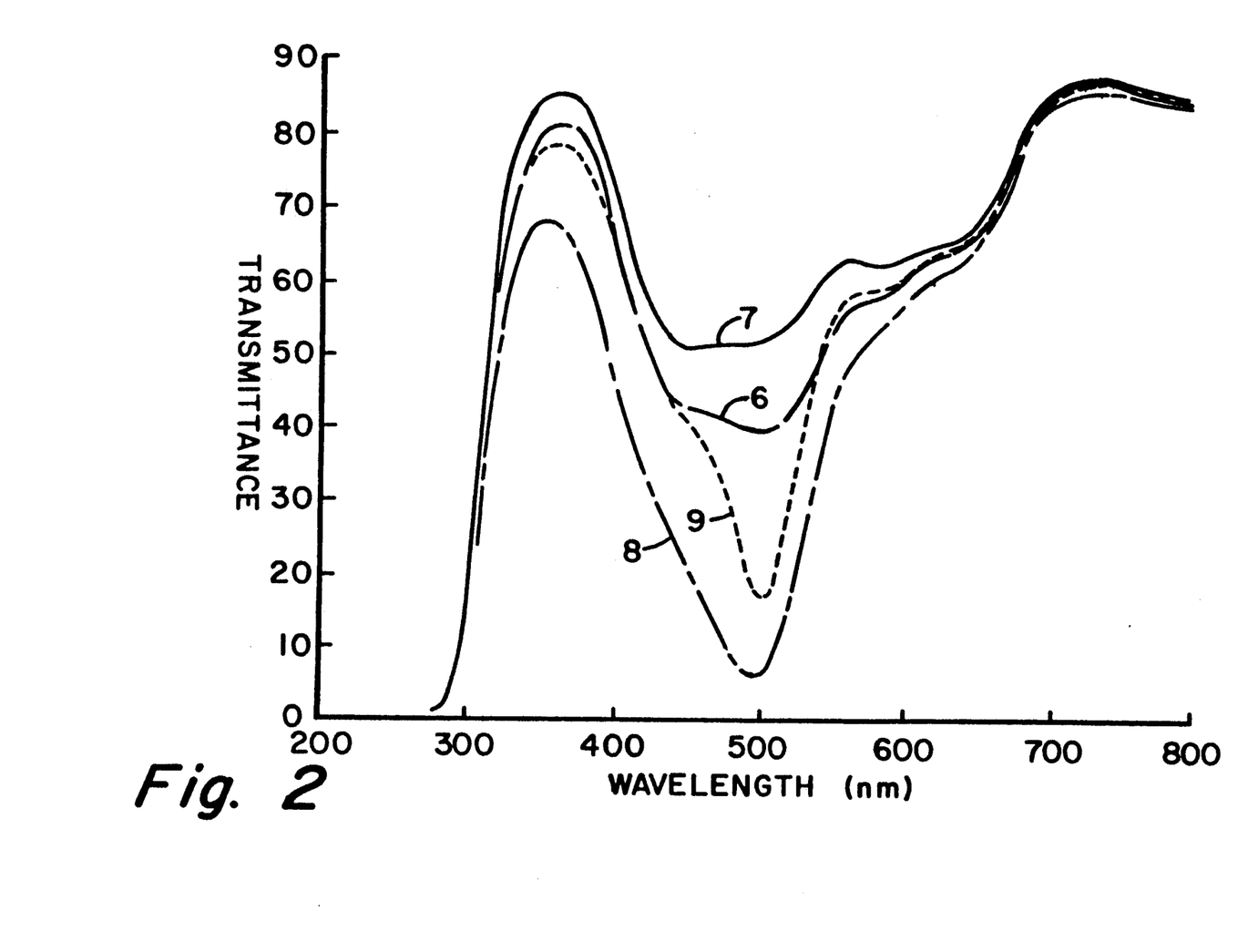

FIG. 2 in the drawing is a graphical representation of the transmittance curves for the several test pieces. Data are plotted as in FIG. 1 and the curves are identified by the test piece numbers as in TABLE III.

EXAMPLE 3

A glass batch was formulated on the basis of composition B. The batch was divided into three aliquots and a minor amount of SnO$_2$ intimately mixed in each aliquot. The amounts of SnO$_2$ added were 0.050, 0.075 and 0.100, each amount being in cation percent of the base glass.

The three glass batches thus created were melted under identical conditions and poured into molds to produce test pieces. One test piece of each melt was given a thermal cycle of 30 minutes at 660° C. and the color observed after treatment. TABLE IV sets forth the amount of SnO$_2$ in each test piece and the degree of coloration observed.

TABLE IV

| Test Piece | SnO$_2$ | Coloration |
|---|---|---|
| 10 | 0.050 | Weak |
| 11 | 0.075 | Weak |
| 12 | 0.100 | Strong |

Figure 3:
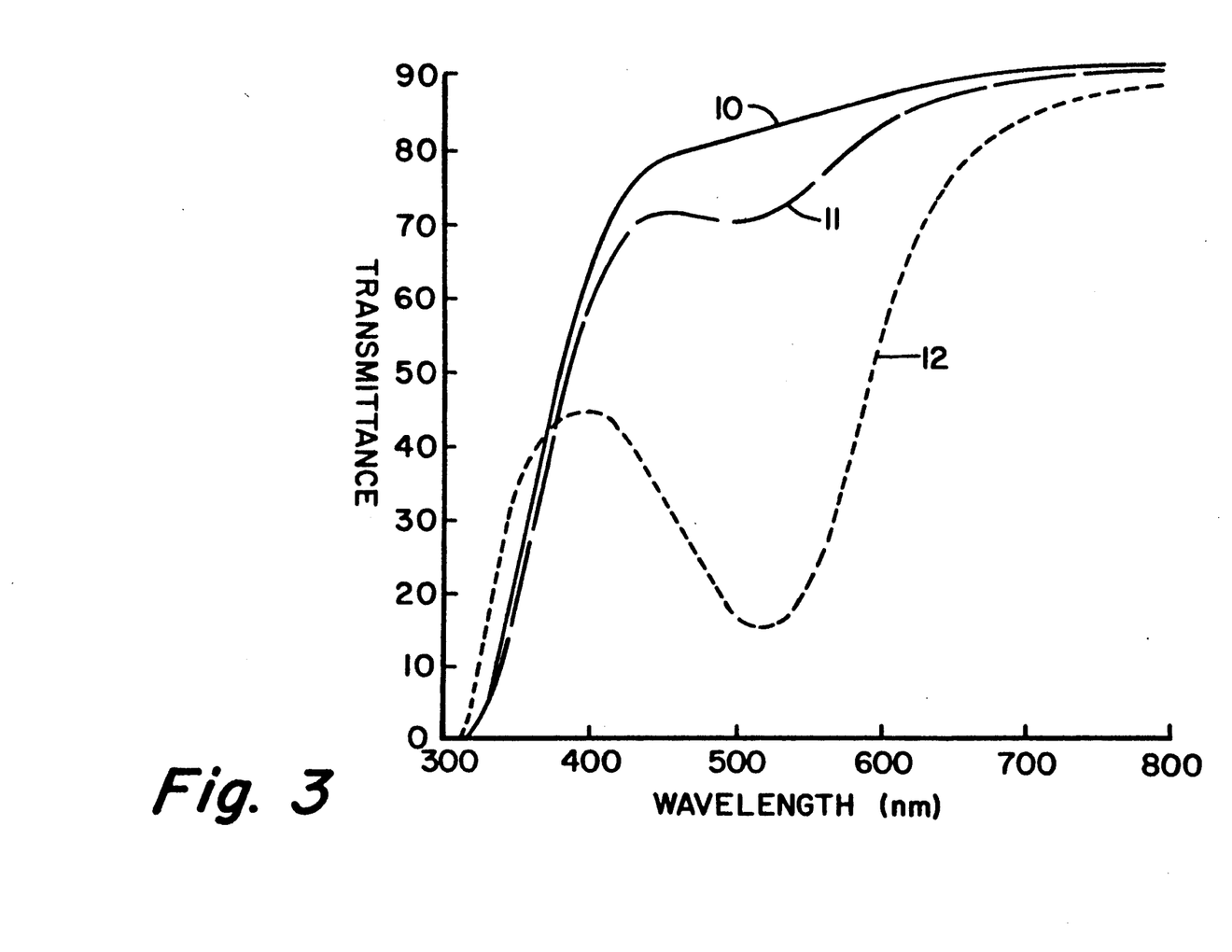

FIG. 3 in the drawing is a graphical representation of the transmittance curves for the test pieces. Data are plotted as in FIG. 1, and the curves are identified by the test piece numbers as in TABLE IV.

EXAMPLE 4

A series of four glass melts was made based on compositions I-L of TABLE I. These compositions were formulated to provide different ratios of the alkali metals in cation percent.

Each melt was poured into a mold to provide a test piece for thermal treatment. The cycle employed was 640° C. for 30 minutes.

TABLE V sets forth the Li/Na/K ratio in cation percent for each test piece; also the degree of coloration observed following the thermal cycle.

TABLE V

| Test Piece | Li/Na/K Ratio | Coloration |
| --- | --- | --- |
| 13 | 1.5/4.3/4.2 | None |
| 14 | 6.5/0.9/2.6 | Moderate |
| 15 | 4/1.6/4.4 | Strong |
| 16 | 1/8/1 | None |

Figure 4:
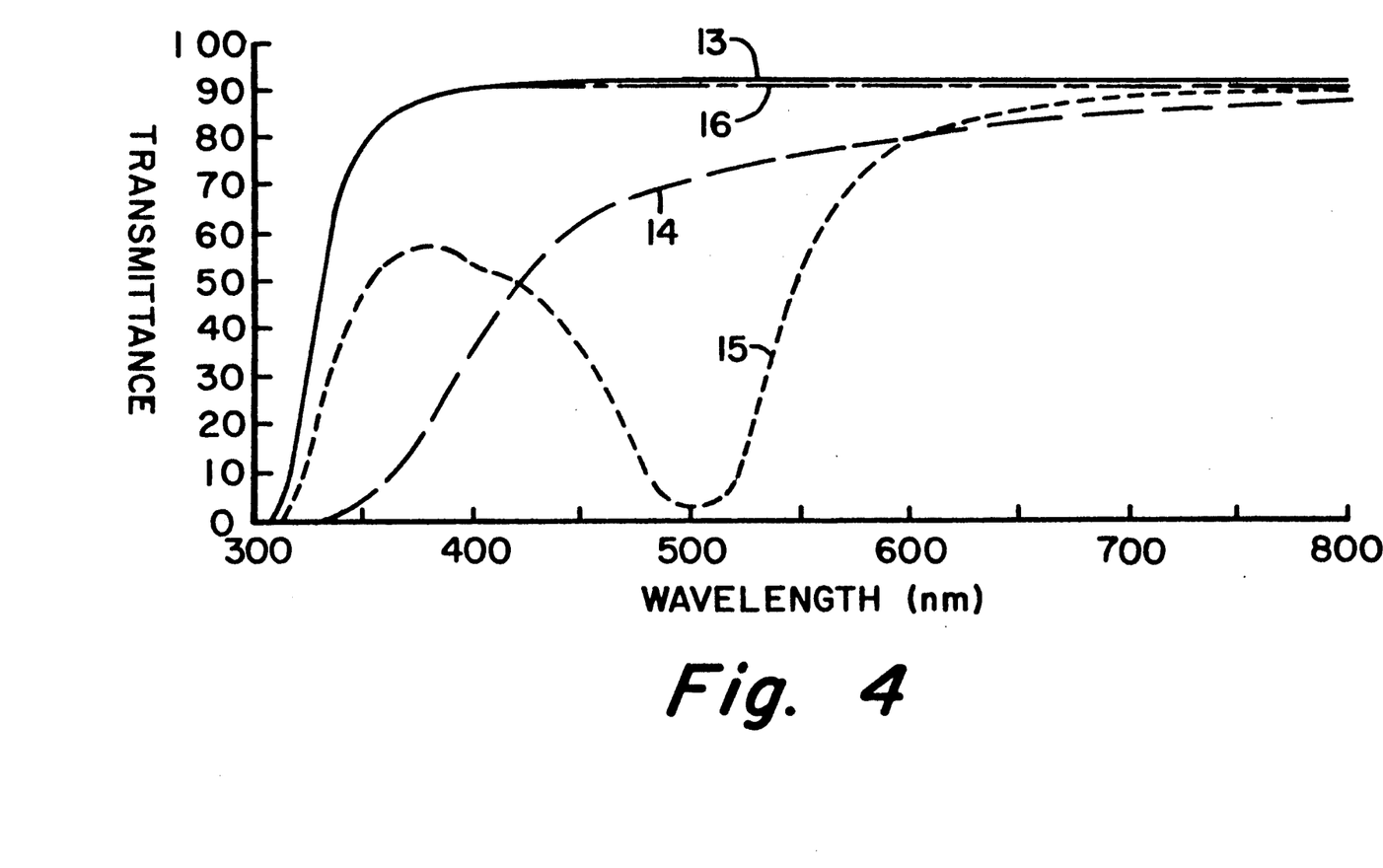

FIG. 4 in the drawing is a graphical representation of the transmittance curves for the test pieces. Data is plotted as in FIG. 1 and the curves are identified by test piece numbers as in TABLE V.

The data suggest that a certain amount of $Li_2O$ is necessary to develop a silver halide phase in this glass, and under the conditions of treatment. However, once such a phase is available, the color obtained appears more dependent on $Na_2O$ content.

It will be appreciated that the data set forth above are unique to the particular glasses and conditions of treatment. As the conditions change, so will the data. Thus, for any given composition the reductant used and treatment conditions will have to be determined following the principles and examples shown above.

EXAMPLE 5

$Fe^{+3}$ values were determined on three test pieces by electron spin resonance spectroscopy. Test piece No. 18 was obtained from the melt identified by the numeral 12 in Example 3. It is compared with a similar piece of the base glass having no reductant added (No. 17); also, with a piece from a melt of the base glass having 0.1 cation percent $Sb_2O_3$ added (No. 19). Test pieces 17, 18 and 19 were measured after a heat treatment for 30 minutes at 650° C.

The data observed from the measurements are shown in TABLE VI.

TABLE VI

| Test Piece | Reductant | $Fe^{+3}$ Value | Coloration |
| --- | --- | --- | --- |
| 17 | None | 1.02 | None |
| 18 | 0.1% $SnO_2$ | 0.68 | Strong |
| 19 | 0.1% $Sb_2O_3$ | 1.03 | None |

The data indicate the effectiveness of 0.1% $SnO_2$ as a reductant to produce color in glass B of TABLE I. They also indicate the ineffectiveness of 0.1% $Sb_2O_3$ in this glass and under the test conditions.

A further study was made on a glass having the composition shown as Ex. D in TABLE I. Five batches of the base glass containing varying amounts of thermal reducing agent and 0.021 wt % CuO were mixed. Each was melted at 1550° C. for 4 hours. The glasses thus obtained are identified in TABLE VII with reference to the cation % of thermal reducing agent (agent) added.

TABLE VII

| Ex. | Agent | Cat. % |
| --- | --- | --- |
| 20 | — | — |
| 21 | $Sb_2O_3$ | 0.03 |
| 22 | $Sb_2O_3$ | 0.06 |
| 23 | $Sb_2O_3$ | 0.12 |
| 24 | $SnO_2$ | 0.025 |

With these glasses, iron proved ineffective as a color gauge in EPR measurement and copper was measured. The $Cu^{2+}$ concentration is obtained by comparing the $Cu^{+2}$ EPR signal with a $Cu^{2+}$ standard having a known cupric oxide concentration.

The $Cu^{2+}/Cu$ ratios observed are shown together with the colors in TABLE VIII.

TABLE VIII

| | Ratio | Color |
| --- | --- | --- |
| 20 | 0.254 | None |
| 21 | 0.062 | Moderate |
| 22 | 0.048 | Strong |
| 23 | 0.046 | Strong |
| 24 | 0.019 | Very Strong |

A study was then made employing a base glass having the composition of a commercially melted photochromic glass, Code No. 8111 from Corning Incorporated. The composition, in approximate percentages by cation and by weight, is:

| | Cation | Wt. |
| --- | --- | --- |
| $SiO_2$ | 46.2 | 56.1 |
| $Al_2O_3$ | 6.0 | 6.2 |
| $B_2O_3$ | 25.8 | 18.2 |
| $Na_2O$ | 6.5 | 4.1 |
| $Li_2O$ | 6.0 | 1.8 |
| $K_2O$ | 6.0 | 5.7 |
| $TiO_2$ | 1.4 | 2.3 |
| $ZrO_2$ | 2.0 | 5.0 |
| Ag | 0.086 | 0.188 |
| CuO | 0.005 | 0.008 |
| Cl | 0.25 | 0.25 |
| Br | 0.20 | 0.20 |

Two melts were made at the standard melting temperature of about 1400° C. One melt contained 0.0% $SnO_2$ as an additive; the other melt contained 0.1% $Sb_2O_3$ as an additive.

A test piece of each melt was poured and cooled. The test pieces were heat treated at 650° C. for 30 minutes. $Fe^{+3}$ values were measured on both test pieces by ESR spectroscopy. The following data were observed:

TABLE IX

| Additive | $Fe^3$ | Coloration |
| --- | --- | --- |
| 0.1% SnO | 0.80 | None |
| 0.1% $Sb_2O_3$ | 0.92 | None |

These data suggest that stronger reducing conditions were required in order to obtain color in this glass.

Additional melts were then made using the same base glass with varying amounts of $SnO_2$ as additive. These melts were made at 1550° C. to determine what, if any, effect the higher melting temperature might have. TABLE X shows the $SnO_2$ additions; the coloration observed in test pieces after heat treatment for 30 minutes at 650° C.; and the ESR values for $Fe^{+3}$ measured on the test pieces.

TABLE X

| $SnO_2$ (cation %) | Coloration | $Fe^{+3}$ |
| --- | --- | --- |
| 0.0 | None | 1.00 |
| 0.025 | Moderate | 0.72 |
| 0.050 | Strong | 0.65 |
| 0.100 | Strong | 0.57 |

This comparison illustrates the effect of the initial melting temperature.

It suggests that the initial melting temperature must be sufficiently high to insure that the thermal reducing agent is at least largely in its lowest state of reduction so that it is available to reduce silver when subsequently heat treated. With the Code 8111 glass, a 1400° C. melting temperature is not sufficiently high, but a melting temperature of 1550° C. is.

We claim:

1. A glass article that exhibits a permanent color throughout its body, that, as melted, consists essentially of $R_2O$, $Al_2O_3$, $B_2O_3$, and $SiO_2$ with Ag and at least one halogen, selected from the group consisting of Cl and Br, dissolved in the glass, and that has present at least one thermal reducing agent in its lowest valence state, the thermal reducing agent being selected from the group consisting of $SnO_2$, $Sb_2O_3$, and $As_2O_3$, and being present in an amount no greater than about 1 cation %, the glass after heat treatment having AgCl and/or AgBr crystals and silver metal particles dispersed throughout the glass, the thermal reducing agent being at least partially oxidized to its higher valence state by electron transfer to the silver to produce silver metal and thereby impart a permanent color to the glass.

2. A glass article in accordance with claim 1 wherein the glass composition as calculated in cation percent consists essentially of 35-70% $SiO_2$, 2-12% $Al_2O_3$, 20-35% $B_2O_3$, 8-30% $R_2O$ selected from 0-20% $Li_2O$, 0-20% $Na_2O$, and 0-12% $K_2O$, 0.01-1% of a thermal reducing agent from the group $SnO_2$, $Sb_2O_3$ and $As_2O_3$, 0.25-1% Cl+Br, 0.10-0.5% Ag and 0-0.1% CuO.

3. A glass in accordance with claim 1 that exhibits photochromic characteristics.

4. A glass in accordance with claim 1 wherein the thermal reducing agent is $SnO_2$.

5. A glass in accordance with claim 1 wherein the thermal reducing agent is $Sb_2O_3$.

6. A glass in accordance with claim 1 wherein the thermal reducing agent content is at least 0.01% but not over 1% of the glass composition.

7. A glass in accordance with claim 1 wherein the halogen is chlorine.

8. A glass in accordance with claim 1 wherein the halogen is a mixture of chlorine and bromine.

* * * * *